(12) United States Patent
Kim et al.

(10) Patent No.: US 9,426,491 B2
(45) Date of Patent: Aug. 23, 2016

(54) IMAGE ENCODING/DECODING METHOD AND APPARATUS USING BLOCK TRANSFORMATION

(75) Inventors: Hayoon Kim, Gyeonggi-do (KR); Yunglyul Lee, Seoul (KR); Joohee Moon, Seoul (KR); Haekwang Kim, Seoul (KR); Byeungwoo Jeon, Gyeonggi-do (KR); Kihun Han, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 1151 days.

(21) Appl. No.: 13/000,977

(22) PCT Filed: Jun. 16, 2009

(86) PCT No.: PCT/KR2009/003220
§ 371 (c)(1),
(2), (4) Date: Mar. 23, 2011

(87) PCT Pub. No.: WO2009/157665
PCT Pub. Date: Dec. 30, 2009

(65) Prior Publication Data
US 2011/0176607 A1 Jul. 21, 2011

(30) Foreign Application Priority Data
Jun. 23, 2008 (KR) .................. 10-2008-0058779

(51) Int. Cl.
*H04N 19/159* (2014.01)
*H04N 19/593* (2014.01)

(52) U.S. Cl.
CPC .................. *H04N 19/593* (2014.11)

(58) Field of Classification Search
CPC .............. H04N 19/00533; H04N 19/00593; H04N 19/00606; H04N 19/00769; H04N 19/00775; H04N 19/00806; H04N 19/00818; H04N 19/00951; H04N 7/26015; H04N 7/26244; H04N 7/26313; H04N 7/34; H04N 19/00; H04N 19/00163; H04N 19/00187; H04N 19/0026; H04N 19/00303; H04N 19/00321; H04N 19/00357; H04N 19/004; H04N 19/00436; H04N 19/0049; H04N 19/00678; H04N 19/00739; H04N 19/00812; H04N 19/00939; H04N 2013/0081; H04N 21/4305; H04N 21/4307; H04N 21/434; H04N 21/4341; H04N 7/0125; H04N 7/014; H04N 7/26; H04N 7/26026; H04N 7/26063; H04N 7/26101; H04N 7/26127; H04N 7/26212; H04N 7/2625; H04N 7/26946; H04N 7/30; H04N 7/345; H04N 7/5073; H04N 7/5086; H04N 1/417; H04N 1/4172; H04N 19/103; H04N 19/105; H04N 19/107; H04N 19/109; H04N 19/11; H04N 19/159; H04N 19/50; H04N 19/52; H04N 19/593; G06T 9/004; G06T 2207/10016; G06T 2207/20021
USPC ........................................ 375/240.01–240.29
See application file for complete search history.

(56) References Cited

U.S. PATENT DOCUMENTS

| | | | |
|---|---|---|---|
| 5,751,362 A | 5/1998 | Lee | |
| 5,805,736 A | 9/1998 | Kim | |
| 2005/0084012 A1* | 4/2005 | Hsu et al. | 375/240.12 |
| 2005/0271142 A1* | 12/2005 | Lee | H04N 19/44 375/240.12 |
| 2006/0165183 A1* | 7/2006 | Numajiri et al. | 375/240.29 |
| 2006/0203917 A1* | 9/2006 | Uchida | H04N 19/159 375/240.24 |
| 2007/0098070 A1* | 5/2007 | Saigo et al. | 375/240.12 |
| 2007/0121731 A1* | 5/2007 | Tanizawa | H04N 19/176 375/240.24 |
| 2007/0268968 A1 | 11/2007 | Sakazume | |
| 2008/0084930 A1* | 4/2008 | Sekiguchi et al. | 375/240.16 |
| 2008/0175317 A1* | 7/2008 | Han et al. | 375/240.12 |
| 2009/0067503 A1* | 3/2009 | Jeong et al. | 375/240.16 |

| A | B | C | D | E | F | G | H | I | J | K | L | M | N | O | P | |
|---|---|---|---|---|---|---|---|---|---|---|---|---|---|---|---|---|
| $a_0$ | $b_0$ | $c_0$ | $d_0$ | $e_0$ | $f_0$ | $g_0$ | $h_0$ | $i_0$ | $j_0$ | $k_0$ | $l_0$ | $m_0$ | $n_0$ | $o_0$ | $p_0$ | ⎤ 820 ⎦ 810 |
| $a_1$ | $b_1$ | $c_1$ | $d_1$ | $e_1$ | $f_1$ | $g_1$ | $h_1$ | $i_1$ | $j_1$ | $k_1$ | $l_1$ | $m_1$ | $n_1$ | $o_1$ | $p_1$ | |
| $a_2$ | $b_2$ | $c_2$ | $d_2$ | $e_2$ | $f_2$ | $g_2$ | $h_2$ | $i_2$ | $j_2$ | $k_2$ | $l_2$ | $m_2$ | $n_2$ | $o_2$ | $p_2$ | |
| $a_3$ | $b_3$ | $c_3$ | $d_3$ | $e_3$ | $f_3$ | $g_3$ | $h_3$ | $i_3$ | $j_3$ | $k_3$ | $l_3$ | $m_3$ | $n_3$ | $o_3$ | $p_3$ | |
| . . . . . . | | | | | | | | | | | | | | | | |
| $a_{15}$ | $b_{15}$ | $c_{15}$ | $d_{15}$ | $e_{15}$ | $f_{15}$ | $g_{15}$ | $h_{15}$ | $i_{15}$ | $j_{15}$ | $k_{15}$ | $l_{15}$ | $m_{15}$ | $n_{15}$ | $o_{15}$ | $p_{15}$ | |

| | | | | |
|---|---|---|---|---|
| 2010/0027655 | A1* | 2/2010 | Matsuo et al. | 375/240.13 |

\* cited by examiner

FOREIGN PATENT DOCUMENTS

| | | | |
|---|---|---|---|
| JP | 2007150913 A | 6/2007 | |

OTHER PUBLICATIONS

International Search Report mailed Jan. 27, 2010 for PCT/KR2009/003220, citing the above references.

*Primary Examiner* — Sath V Perungavoor
*Assistant Examiner* — Nathnael Aynalem
(74) *Attorney, Agent, or Firm* — Hauptman Ham, LLP (57) ABSTRACT

Video encoding/decoding method and apparatus using a block transformation are disclosed. The apparatus encodes the video through predicting each pixel in a current block of the video by using one or more adjacent pixels, which are encoded prior to encoding the current block and have the closest proximity to the pixels respectively in a predetermined prediction direction, and wherein the current block is sized L×M with L being unequal to M. It has become possible to predict the pixels in the block starting from closest one of the pixels in the prediction direction in order to provide more accurate block predictions and then raise the compression efficiency that leaps to more efficient video encoding/decoding performance.

6 Claims, 9 Drawing Sheets

Figure 1

--Prior Art--

Figure 2

--Prior Art--

Figure 3

--Prior Art--

| | A | B | C | D | E | F | G | H | |
|---|---|---|---|---|---|---|---|---|---|
| I | $a_0$ | $b_0$ | $c_0$ | $d_0$ | $e_0$ | $f_0$ | $g_0$ | $h_0$ | |
| J | $a_1$ | $b_1$ | $c_1$ | $d_1$ | $e_1$ | $f_1$ | $g_1$ | $h_1$ | |
| K | $a_2$ | $b_2$ | $c_2$ | $d_2$ | $e_2$ | $f_2$ | $g_2$ | $h_2$ | |
| L | $a_3$ | $b_3$ | $c_3$ | $d_3$ | $e_3$ | $f_3$ | $g_3$ | $h_3$ | |
| M | $a_4$ | $b_4$ | $c_4$ | $d_4$ | $e_4$ | $f_4$ | $g_4$ | $h_4$ | |
| N | $a_5$ | $b_5$ | $c_5$ | $d_5$ | $e_5$ | $f_5$ | $g_5$ | $h_5$ | |
| O | $a_6$ | $b_6$ | $c_6$ | $d_6$ | $e_6$ | $f_6$ | $g_6$ | $h_6$ | |
| P | $a_7$ | $b_7$ | $c_7$ | $d_7$ | $e_7$ | $f_7$ | $g_7$ | $h_7$ | |

Top row labeled 1020; rows I and J bracketed as 1010.

IMAGE ENCODING/DECODING METHOD AND APPARATUS USING BLOCK TRANSFORMATION

CROSS REFERENCE TO RELATED APPLICATION

This application claims the priority of Korean Patent Application No. 2008-0058779, filed on Jun. 23, 2008 in the KIPO (Korean Intellectual Property Office), the disclosure of which is incorporated herein in their entirety by reference. Further, this application is the National Phase application of International Application No. PCT/KR2009/003220, filed Jun. 16, 2009, which designates the United States and was published in English. Each of these applications is hereby incorporated by reference in their entirety into the present application.

TECHNICAL FIELD

The present disclosure relates to a video encoding/decoding method and apparatus using a block transformation. More particularly, the present invention relates to a video encoding/decoding method for a current block through its prediction from the adjacent blocks wherein predictions are performed on the entire pixels of the current block starting from closest one of the pixels in the prediction direction.

BACKGROUND ART

Moving Picture Experts Group (MPEG) and Video Coding Experts Group (VCEG) have developed an improved and excellent video compression technology over existing MPEG-4 Part 2 and H.263 standards. The new standard is called H.264/AVC (Advanced Video Coding) and was released simultaneously as MPEG-4 Part 10 AVC and ITU-T Recommendation H.264. Such H.264/AVC (hereinafter referred to as 'H.264') uses a spatial predictive coding method, which is different from conventional video coding international standards such as MPEG-1, MPEG-2, MPEG-4 Part2 Visual and the like.

Conventional video coding methods use "intra prediction" for coefficients transformed in Discrete Cosine Transform Domain (or DCT Transform Domain) to seek higher encoding efficiency resulting in degradation of the subjective video quality at low band transmission bit rates. However, H.264 adopts the method of encoding based on a spatial intra prediction in a spatial domain rather than in a transform domain.

An encoder that uses a coding method based on the conventional spatial intra prediction predicts current block information from information of the previously encoded and reconstructed previous blocks, encodes information on just the difference of the prediction block from the actual block to encode, and transmits the encoded information to a decoder. Then, the encoder may transmit parameters needed for prediction of the block to the decoder or the encoder and decoder may be synchronized, so that they share the needed parameters for the decoder to predict the block. In terms of the decoder, the block information to be currently decoded is predicted using previously decoded and reconstructed adjacent block information and then added to the difference information transmitted from the encoder, which reconstructs the block to be decoded. Then, again, if the parameters needed for the prediction are transmitted from the decoder, the parameters can be decoded and used for prediction.

The above described intra prediction may be an intra_4×4 prediction, intra_16×16 prediction, intra_8×8 prediction and the like, where the respective intra predictions include a plurality of prediction modes.

Figure 1:
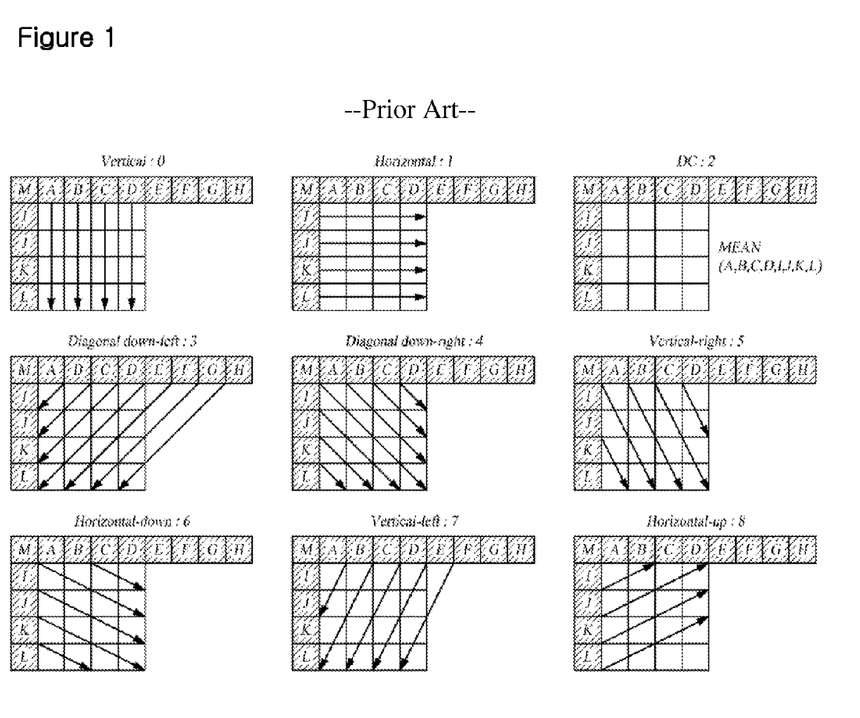
FIG. 1 is a diagram showing conventional nine 4×4 intra prediction modes.

FIG. 1 is a diagram showing conventional nine 4×4 intra prediction modes.

Referring to FIG. 1, the intra_4×4 prediction has nine prediction modes which include a vertical mode, horizontal mode, direct current (DC) mode, diagonal down-left mode, diagonal down-right mode, vertical-right mode, horizontal-down mode, vertical-left mode and horizontal-up mode.

Figure 2:
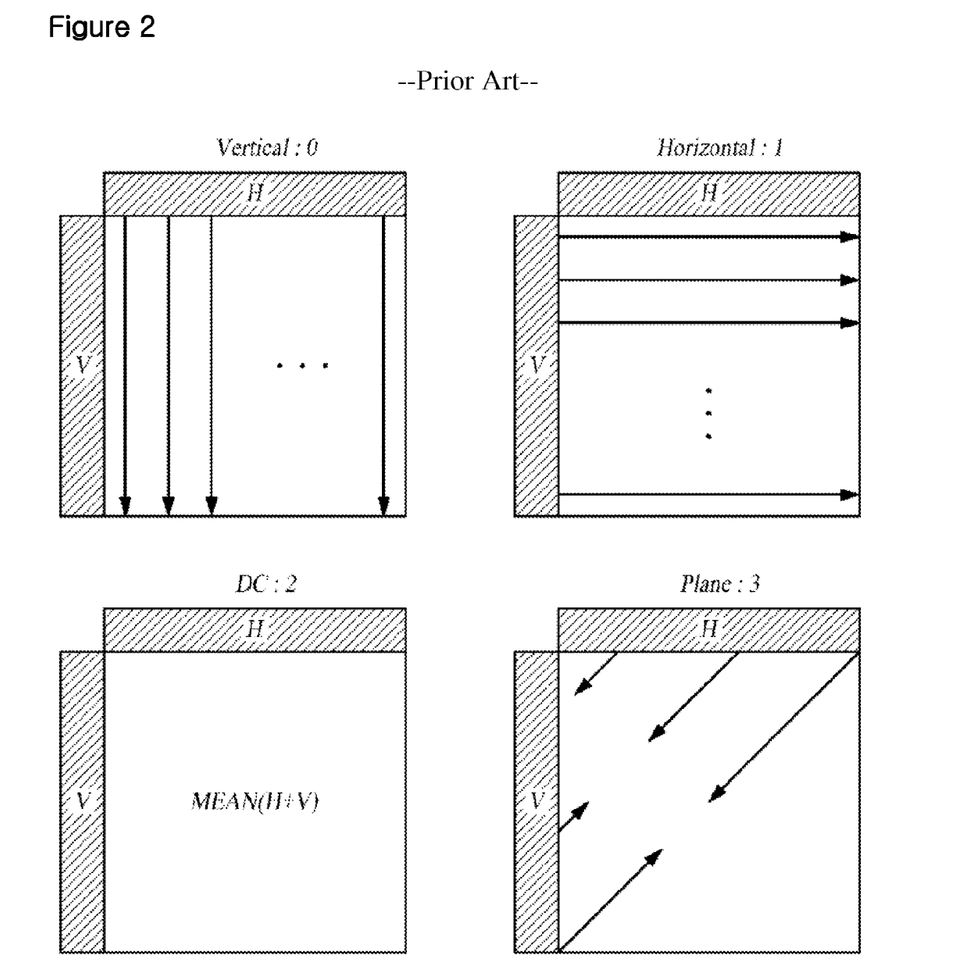
FIG. 2 is a diagram showing conventional four 16×16 intra prediction modes.

FIG. 2 is a diagram showing conventional four 16×16 intra prediction modes.

In FIG. 2, the intra_16×16 prediction has four prediction modes which include a vertical mode, horizontal mode, DC mode and plane mode. The intra_8×8 prediction also has four modes similar to the intra_16×16 prediction.

All of the intra prediction modes described in FIGS. 1 and 2 predict the current blocks by generating predicted pixel values from the previously encoded or decoded pixels neighboring the current blocks. Typically in H.264, the intra predictions are performed in square block unit, and the prediction blocks for the intra prediction are sized 16×16, 8×8, and 4×4 for the intra_16×16 prediction, intra_8×8 prediction, and intra_4×4 prediction, respectively.

The reason for carrying out intra predictions in the N×N sized square is that the subsequent discrete cosine transform (hereinafter called DCT transform) for compressing the post-intra prediction residual signals and the quantization procedure are likewise performed by regular square (4×4, 8×8). However, performing the intra predictions by such regular square blocks may degrade the accuracy of prediction since the pixels to be predicted are predicted using relatively distant pixels, resulting in low efficiency of the compression.

Figure 3:
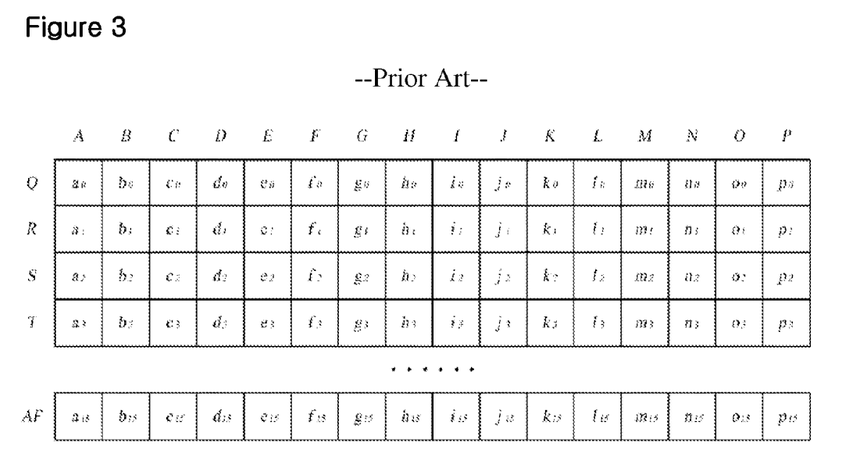
FIG. 3 illustrates adjacent pixels and the current block pixels used for the typical intra_16×16 prediction.

FIG. 3 illustrates adjacent pixels and the current block pixels used for the typical intra_16×16 prediction.

256 pixels in the lower case letters $a_0$ to $p_{15}$ represent the pixels in the current block, while 32 pixels in the upper case A to AF are adjacent pixels of the neighboring blocks which had been compressed prior to the compression of the current block. For the vertical intra prediction in FIG. 3, the first column of pixels $a_0$~$a_{15}$ may be predicted from pixel A, and the second column of pixels $b_0$~$b_{15}$ may be predicted from pixel B. The remaining pixels $c_0$~$p_{15}$ may be predicted from the upper pixels C~P, respectively. In this case, the pixels $a_0$~$p_0$ are predicted from the adjacent pixels A~P with the spatially closest proximity in the direction of prediction, but the pixels $a_1$~$p_1$ are spatially distanced from the adjacent pixels A~P by two pixels as the pixels $a_{15}$~$p_{15}$ are spatially distanced from the adjacent pixels A~P by sixteen pixels, which degrades the accuracy of the intra prediction and in turn the compression efficiency.

DISCLOSURE

Technical Problem

Therefore, the present disclosure has been made in view of the above mentioned problems to provide a video encoding/decoding of a current block through its prediction from the adjacent blocks wherein the prediction of the entire pixels of the current block is performed starting from the most proximal pixel along the direction of prediction before the video encoding/decoding.

Technical Solution

One embodiment of the present disclosure provides an apparatus for encoding an input video comprising an intra predictor for predicting a rectangular current block by using one or more adjacent pixels according to a predetermined prediction direction and generating a rectangular prediction block; a block rectangle-shaper for generating the rectangular shape of the current block according to the prediction direction from the input video; a subtractor for generating a rectangular residual block by subtracting the rectangular prediction block from the rectangular current block; a rearranger for rearranging the rectangular residual block into a square residual block; a transformer for transforming the square residual block into a frequency domain; a quantizer for performing quantization with respect to the transformed residual block; and an encoder for encoding the quantized residual block into a bitstream.

Another embodiment provides a method for encoding an input video comprising: performing intra prediction for predicting a rectangular current block by using one or more adjacent pixels according to a predetermined prediction direction and generating a rectangular prediction block; performing a rectangle-shaping with respect to a block for generating the rectangular shape of the current block from the input video according to the prediction direction; subtracting the rectangular prediction block from the rectangular current block and generating a rectangular residual block; rearranging the rectangular residual block into a square residual block; transforming the square residual block into a frequency domain; performing quantization with respect to the transformed residual block; and encoding the quantized residual block into a bitstream.

Yet another embodiment provides apparatus for decoding a video comprising: a decoder for decoding a bitstream and extracting residual block; an inverse quantizer for performing an inverse quantization with respect to the extracted residual block; an inverse transformer for performing an inverse transformation with respect to the inverse quantized residual block into a time domain; an inverse rearranger for performing an inverse rearrangement with respect to the inverse transformed residual block into a rectangular residual block according to a predetermined prediction direction; an intra predictor for predicting a rectangular current block by using one or more adjacent pixels according to the prediction direction and generating a rectangular prediction block; an adder for adding the rectangular residual block to the rectangular prediction block in order to generate the rectangular current block; and a reconstructor for reconstructing the video for output by using the rectangular current block according to the prediction direction.

Yet another embodiment provides a method for decoding a video comprising: decoding a bitstream and extracting residual block; performing an inverse quantization with respect to the extracted residual block; performing an inverse transformation with respect to the inverse quantized residual block into a time domain; performing an inverse rearrangement with respect to the inverse transformed residual block into a rectangular residual block according to a predetermined prediction direction; performing an intra prediction with respect to a rectangular current block by using one or more adjacent pixels according to the prediction direction and generating a rectangular prediction block; adding the rectangular residual block to the rectangular prediction block in order to generate the rectangular current block; and reconstructing the video for output by using the rectangular current block according to the prediction direction.

Yet another embodiment provides an apparatus for encoding a video having a current block with pixels by using one or more respectively adjacent pixels encoded prior to encoding the current block and each having the highest proximity to the respective current block pixels in a predetermined prediction direction, wherein the current block being a block sized L×M with L being unequal to M.

Yet another embodiment provides an apparatus for decoding a video having a current block with pixels by using one or more respectively adjacent pixels encoded prior to decoding the current block and each having the highest proximity to the respective current block pixels in a predetermined prediction direction, wherein the current block being a block sized L×M with L being unequal to M.

ADVANTAGEOUS EFFECTS

As described above, according to the disclosure, the current block of a video is predicted from the adjacent blocks for encoding/decoding the video wherein the prediction of the pixels in the block can be performed starting from the adjacent pixels with the highest proximity in the spatial prediction direction, thereby improving the accuracy of the block predictions toward a better compression efficiency to achieve an efficient encoding/decoding of the video.

DESCRIPTION OF DRAWINGS

The drawings described herein are for illustration purposes only and are not intended to limit the scope of the present disclosure in any way.

MODE FOR INVENTION

Figure 4:
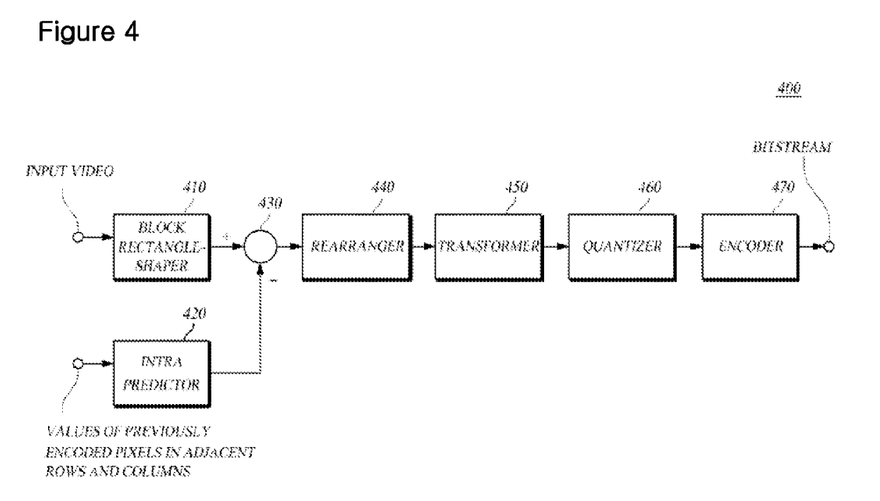
FIG. 4 is a schematic block diagram of an electronic configuration of a video encoding apparatus according to an embodiment.

FIG. 4 is a schematic block diagram of an electronic configuration of a video encoding apparatus according to an embodiment.

A video encoding apparatus 400 according to an embodiment of the present disclosure is configured to encode a video having a current block with pixels by using one or more respectively adjacent pixels encoded prior to encoding the current block pixels and each having the highest proximity to the respective current pixels in a predetermined prediction direction, and the encoding apparatus 400 may be comprised of a block rectangle-shaper 410, an intra predictor 420, a subtractor 430, a rearranger 440, a transformer 450, a quantizer 460, and an encoder 470. Here, the current block may be a block sized L×M with L being unequal to M.

Video encoder 400 may be a personal computer or PC, notebook or laptop computer, personal digital assistant or PDA, portable multimedia player or PMP, PlayStation Portable or PSP, or mobile communication terminal or such devices, and may represent a variety of apparatuses equipped with, for example, a communication system such as a modem for carrying out communications between various devices or wired/wireless communication networks, a memory for storing various programs for encoding videos and related data, and a microprocessor for executing the programs to effect operations and controls.

From an input video, block rectangle-shaper 410 generates a rectangular current block according to a prediction direction.

Here, the prediction direction refers to such prediction directions as determined by various intra prediction modes (i.e., the respective four prediction modes in the intra_8×8 prediction and in the intra_16×16 prediction) from which intra predictor 420 selects the fitting prediction direction to the characteristics of the video, thereby electing its optimal prediction mode. Therefore, upon receiving information on the prediction direction from intra predictor 420, block rectangle-shaper 410 may generate the rectangular current block in that prediction direction.

The rectangular current block means a current block to be encoded that is configured in a rectangular shape. Specifically, because a typical encoding scheme performs discrete cosine transform by blocks of 4×4 or such N×N size and then enters quantization, it is also preferable to have the current block configured as an N×N sized square when predicting the values of pixels in the current block. In this occasion, however, the prediction of the current block pixels needs to use the adjacent pixels with farther distances from the current pixel to predict depending on the prediction direction, causing low efficiency of the prediction. To solve this problem, the present disclosure adopts current block rectangles of size 16×1, 1×16, 8×2, 2×8 or so as L×M (where L≠M) in order to employ the adjacent pixels with the highest proximity in predicting the current pixel values to thereby improve the prediction efficiency. The thus predicted current block or rectangular prediction block in L×M sized rectangle is subtracted by the rectangular current block that has been transformed from the input video in block rectangle-shaper 410 to generate a rectangular residual block, which is rearranged by rearranger 440 into an N×N square residual block before it can be transformed into a frequency domain by utilizing transformer 450 that performs DCT transform in N×N size of block unit.

In generating the rectangular current block in the prediction direction from the input video as described above, if an intra block is defined as a 16×16 block and the prediction direction is vertical, then the block rectangle-shaper 410 may either derive a 16×1 sized block rectangle (row form) from the input video to allow each of the current block pixels to be predicted from the adjacent pixels with the vertically closest proximity or derive a 1×16 sized block rectangle (column form) from the input video to allow each of the current block pixels to be predicted from the adjacent pixels with the horizontally closest proximity.

If an intra block is defined as a 8×8 block and the prediction direction is vertical, then block rectangle-shaper 410 may derive a 8×2 sized block rectangle (2-row form) from the input video to allow each of the current block pixels to be predicted from the adjacent pixels with the vertically closest proximity, and if an 8×8 block is defined and the prediction direction is horizontal, then it may derive a 2×8 sized block rectangle (2-column form) from the input video to allow each of the current block pixels to be predicted from the adjacent pixels with the horizontally closest proximity. Here, to have the block sized 2×8 or 8×2 and shaped in "2 columns" for the intra block of 8×8 shape is intended to make the total pixel number of 16, which can be rearranged squarely into N×N sizes such as 4×4 so that transformer 450 and quantizer 460 may transform and quantize the same in N×N sizes of the block.

In short, the presently disclosed rectangular block such as the rectangular current block, rectangular prediction block, or rectangular residual block may be an L×M sized block with L and M being unequal as determined in accordance with the above described prediction direction. In particular, if the prediction direction is vertical, L may be greater than M as in 16×1 and 8×2, and if the prediction direction is horizontal, L may be less than M as in 1×16 and 2×8.

Intra predictor 420 may predict the rectangular current block by using one or more adjacent pixels in a predetermined direction to generate a rectangular prediction block. Herein, intra predictor 420 may find the prediction direction by performing predictions with respect to a predetermined size of intra block in different prediction modes and determining a lowest-cost prediction mode as the optimal prediction mode, although the predictions may be made alternatively in acquired prediction directions upon acquiring information on such directions. Herein, intra predictor 420 may find the prediction direction by performing predictions with respect to a predetermined size of intra block in different prediction modes and determining a lowest-cost prediction mode as the optimal prediction mode, although the predictions may be made alternatively in acquired prediction directions upon acquiring information on such directions. In such a case, the above described block rectangle-shaper 410 may also acquire information on the predetermined prediction direction from other source than intra predictor 410.

Intra predictor 420 knowing the prediction direction may predict each of the current block pixels by using one or more pixels, which were previously encoded before the encoding of the currently selected current block and are in proximity to the current block in the prediction direction. In other words, in a similar manner to block rectangle shaper 410, intra predictor 420 may select the rectangular current block pixels to be predicted and predict them by using one or more pixels contained in the rectangular adjacent block that is selected from the adjacent rectangular blocks encoded previously of the rectangular current block as being in a close proximity to the rectangular current block in the prediction direction.

Herein, being in proximity in the prediction direction means that if the rectangular current block is in a row form, the row of pixels is accompanied above and below thereof by two blocks with a close proximity to the current block where the pixels in the previously encoded one of the two blocks become the adjacent pixels. Being in proximity in the prediction direction also means that if the rectangular current block is in a column form, the column of pixels is accompanied left and right thereof by two blocks with a close proximity to the current block where the pixels in the previously encoded one of the two blocks become the adjacent pixels.

Subtractor 430 may subtract the rectangular prediction block from the rectangular current block to generate a rectangular residual block. Therefore, subtractor 430 may subtract the predicted pixel value of each of the pixels in the rectangular prediction block supplied by intra predictor 420 from the original pixel value of each of the pixels in the rectangular current block supplied by block rectangle-shaper 410 to generate the residual signal between the pixels in the shape of a rectangular residual block.

Rearranger 440 may rearrange the rectangular residual block into a square residual block. That is, rearranger 440 may rearrange the rectangular residual block generated by subtractor 430 into the square form so that it can be immediately used in DCT transform by transformer 450, which operates on N×N sized square blocks. The operation of rearranger 440 to turn the rectangular residual block into its square equivalent will be described in detail below with reference to FIGS. 8 to 11.

Transformer 450 may transform the square residual block into frequency domain. In transforming the rectangular residual block to the frequency domain, transformer 450 may use the DCT transform, although it is not so limited that various other improved or modified transformation techniques may be used with or without involving the DCT for transforming the video signal of time-domain into that of frequency domain.

Quantizer 460 may quantize the transformed residual block from transformer 450. According to an embodiment, while the rectangular current block is to predict through using the previously encoded adjacent pixels in order to predict each of the pixels in the current block from the highest proximal pixel, the transformer 450 and quantizer 460 may operate by unit of 16 pixels (4×4 pixels) to carry out the transform into the frequency domain and quantization as in the typical transform in H.264. This became possible with rearranger 440 transforming the rectangular residual block into the square residual block that is properly squared as N×N to be processed in transformer 450 and quantizer 460.

The encoder 470 encodes the quantized residual block into bitstream.

Encoder 470 may encode information on prediction modes and prediction directions determined in intra predictor 420 along with the quantized residual block. Entropy encoding may be used for the encoding technology, although it is not to limit employing various other encoding methods.

Figure 5:
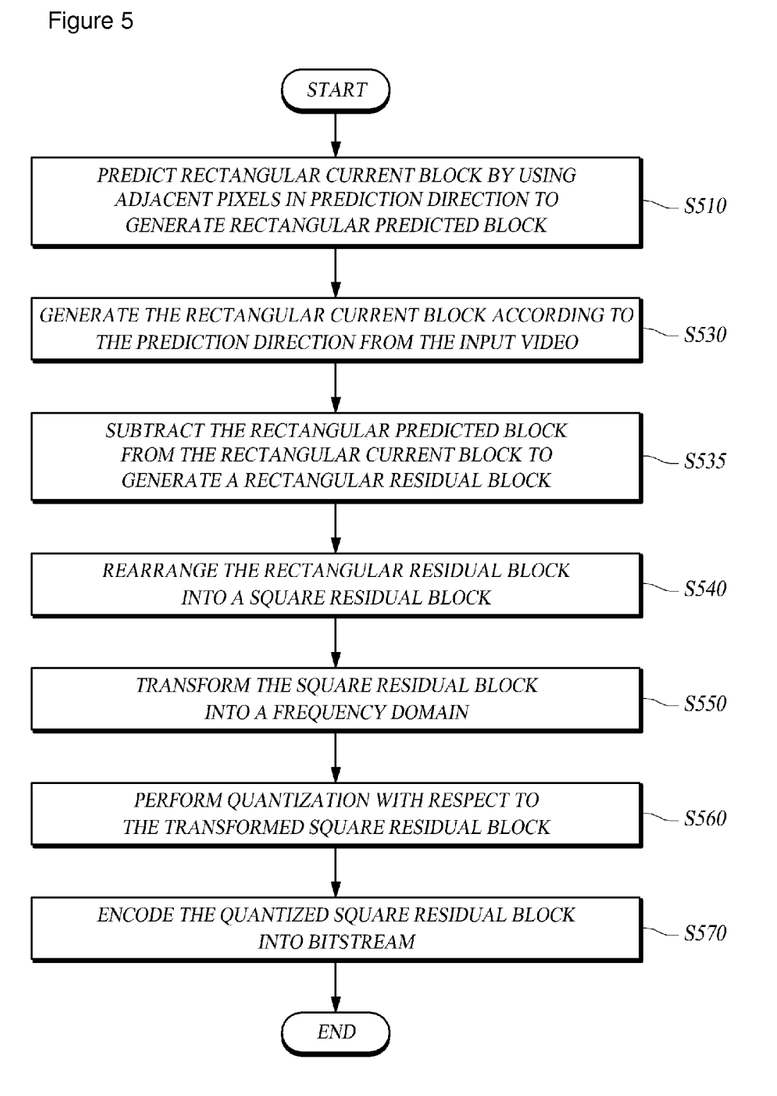
FIG. 5 is a flow diagram for illustrating a method for encoding a video according to an embodiment.

FIG. 5 is a flow diagram for illustrating a method for encoding a video according to an embodiment.

In operation, video encoding apparatus 400 reduces data amount to achieve a higher encoding efficiency by encoding the difference between the values of the actual pixels in the current block to be encoded and the values of the pixels in the predicted current block from the adjacent previously encoded blocks, in other words, by encoding the residual signal.

In order to obtain predicted pixel values of the current block in a way to improve both the accuracy of prediction and the efficiency of compression through having the pixels be predicted from the most proximal pixels, video encoding apparatus 400 may predict a rectangular current block by using one or more adjacent pixels in a predetermined prediction direction and generate a rectangular prediction block in step S510, and it may generate the rectangular current block according to the prediction direction from an input video at S530.

With the rectangular prediction block and rectangular current block generated, video encoding apparatus 400 subtracts the rectangular prediction block from the rectangular current block to generate a rectangular residual block at S535, and rearranges the rectangular residual block into a square residual block at S540.

Upon rearranging the residual block into a square, video encoding apparatus 400 transforms the squared residual block into a frequency domain through DCT transform or similar process at S550, performs quantization with respect to the transformed square residual block at S560, and encodes the quantized square residual block into bitstream at S570. When encoding the quantized residual block into bitstream, video encoding apparatus 400 may also encode information on the prediction direction in accordance with the prediction mode along with the residual block into bitstream.

The encoded bitstream of video by the video encoding apparatus 400 as described above may then be transmitted in real time or non-real-time to video decoding apparatuses for decoding the same before its reconstructions and reproductions via a wired/wireless communication network including the Internet, a short range wireless communication network, a wireless LAN network, WiBro (Wireless Broadband) also known as WiMax network, and mobile communication network or a communication interface such as cable or USB (universal serial bus).

Figure 6:
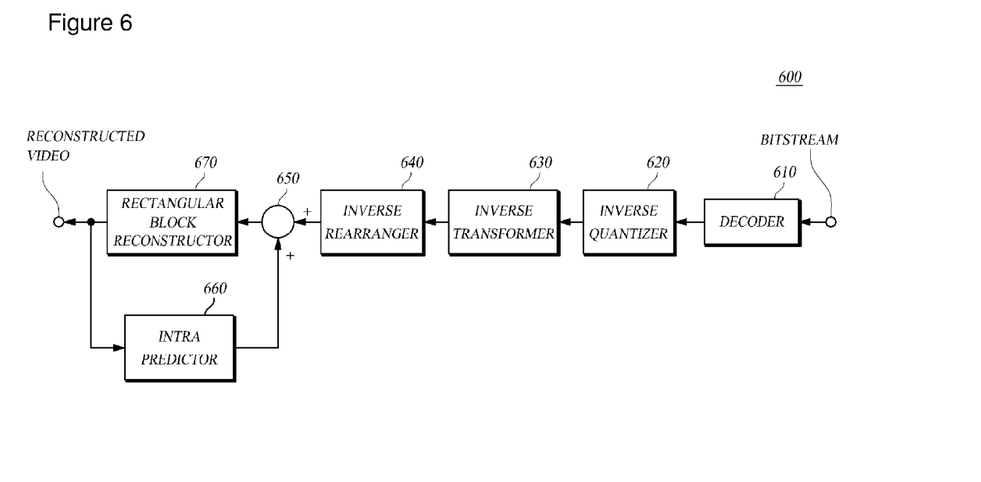
FIG. 6 is a schematic block diagram of an electronic configuration of a video decoding apparatus according to an embodiment.

FIG. 6 is a schematic block diagram of an electronic configuration of a video decoding apparatus according to an embodiment.

A video decoding apparatus 600 according to an embodiment of the present disclosure is adapted to decode a video having a current block with pixels by using one or more respectively adjacent pixels encoded prior to decoding the current block pixels and each having the highest proximity to the respective current pixels in a predetermined prediction direction, and the video decoding apparatus 600 may be comprised of a decoder 610, an inverse quantizer 620, an inverse transformer 630, an inverse rearranger 640, an adder 650, an intra predictor 660, and a rectangular block reconstructor 670. Here, the current block may be a block sized L×M where L unequals to M.

As described for the video encoding apparatus 400 with reference to FIG. 4, the video decoder 600 may be a personal computer or PC, personal digital assistant or PDA, portable multimedia player or PMP, PlayStation Portable or PSP, or mobile communication terminal or such devices, and may represent a variety of apparatuses equipped with, for example, a communication system such as a modem for carrying out communications between various devices or wired/wireless communication networks, a memory for storing various programs for encoding videos and related data, and a microprocessor for executing the programs to effect operations and controls.

Decoder 610 may decode bitstream to extract a square residual block. To be specific, decoder 610 decodes the bitstream of the encoded video by video encoding apparatus 400 to extract the square residual block, which includes pixel information of the current block of the video.

When decoding the bitstream to extract the residual block from the bitstream of the encoded video received from video encoding apparatus 400, decoder 610 may further extract information on the prediction mode or on the prediction direction if it is included in the bitstream for performing the intra prediction. Therefore, video encoding apparatus 400 and video decoding apparatus 600 may be synchronized to operate with respect to the prediction direction for the intra prediction so that the intra prediction is consistently performed in a predetermined direction of prediction and alternatively the video encoding apparatus 400 may take its video encoding session to further encode the information on the prediction direction for the intra prediction into the bitstream and then the video decoding apparatus 600 in its decoding session may also extract the information on the prediction direction from the bitstream in order to know the direction of prediction.

Inverse quantizer 620 may perform inverse quantization or de-quantization with respect to the square residual block extracted by decoder 610 from the bitstream. Inverse transformer 630 may perform inverse transformation with respect to the inverse quantized square residual block by inverse quantizer 620 into time domain.

Inverse rearranger 640 may rearrange the inverse transformed square residual block by inverse transformer 630 back into the rectangular residual block in line with the prediction direction. Particularly, upon receiving the inverse transformed square residual block from inverse transformer 630, inverse rearranger 640 checks the prediction direction to determine the size of the required block rectangle in which the square residual block should be transformed in line with the prediction direction. For example, in the case of vertical prediction direction, the rectangular block sized L×M may be so determined as to be L>M like 16×1 or 8×2, and in the horizontal prediction direction it may be set L<M as in 1×16 or 2×8.

If it is set as L>M for the vertical prediction direction, whether to make the inverse rearrangement into a 16×1 sized rectangular residual block or a 8×2 sized such block may then be determined by the information synchronized between video encoding apparatus 400 and video decoding apparatus 600, and the same applies to whether to make the inverse rearrangement into a 1×16 sized rectangular residual block or a 2×8 sized block if L<M for the horizontal prediction direction. In other words, if the synchronization between video encoding apparatus 400 and video decoding apparatus 600 is set to perform the intra 16×16 prediction with respect to the current block or the current frame, the inverse rearrangement may be performed toward 16×1 (for vertical direction) or 1×16 (horizontal direction) sized rectangular residual block, and if the synchronization therebetween is set to perform the intra 8×8 prediction with respect to the current block or the current frame, the inverse rearrangement may be performed toward 8×2 (for vertical direction) or 2×8 (horizontal direction) sized rectangular residual block.

In addition, the prediction direction may be determined by using the information extracted from the bitstream at decoder 610, or it may correspond to the synchronized prediction direction or prediction mode between video decoding apparatus 600 and video encoding apparatus 400 while inverse rearranger 640 may acquire such information on the prediction direction either from decoder 610 or from other sources that stores it.

Adder 650 may add the rectangular residual block generated in inverse rearranger 640 to the rectangular prediction block from intra predictor 660 in order to generate the rectangular current block.

Intra predictor 660 may predict the rectangular current block by using one or more adjacent pixels in the prediction direction to generate the rectangular prediction block. That is, intra predictor 660 may acquire either the information on the extracted prediction direction from the bitstream in decoder 610 or the prediction directional portion of the entire information in synchronization with video encoding apparatus 400 to get the prediction direction and accordingly identify the size and shape of the current block (i.e., any size and shape out of 16×1, 1×16, 8×2, or 2×8) in order to predict the identified current block pixels one by one using one or more adjacent pixel values in the prediction direction. Here, one or more adjacent pixels refer to those decoded prior to decoding the identified rectangular current block as described above and being adjacent to the same block along the prediction direction.

Rectangular block reconstructor 670 may reconstruct the output video by using the rectangular current block along the described prediction direction as described above. More specifically, since the current block output from adder 650 has been shaped into the rectangle by adding the inverse rearranged rectangular residual block to the prediction block in intra predictor 660, it is in condition for adding in the prediction direction to the previously decoded rectangular block that underwent the decoding process immediately before decoding this current block following the prediction direction in order to reconstruct the output video. For example, if the prediction direction is vertical, the previously decoded rectangular block that underwent the decoding process just before decoding this current block and the current block are both in row form of rectangles and sized 16×1 or 8×2 and thus the presently decoded current block may be added as a lower row to the previously decoded rectangular block, thereby reconstructing the output video.

Figure 7:
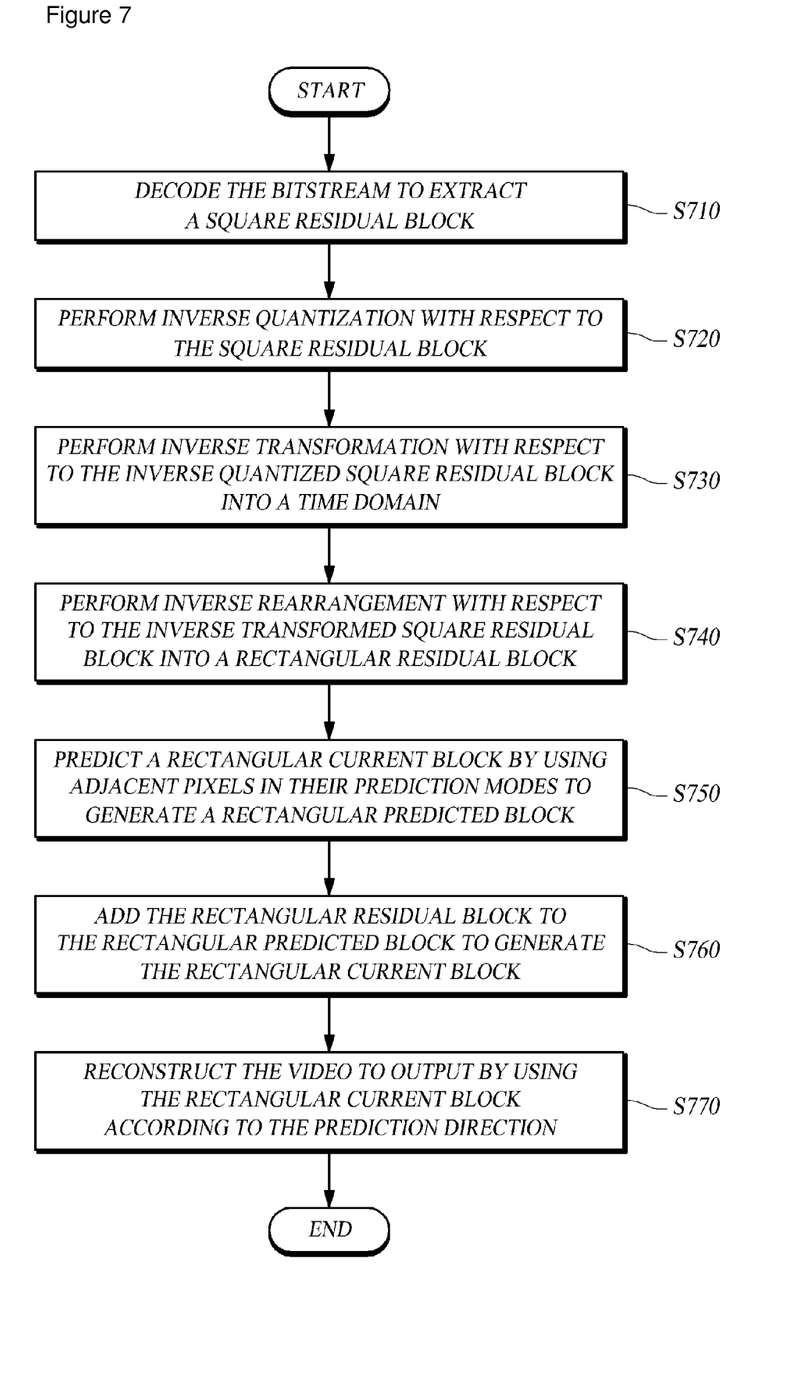
FIG. 7 is a flow diagram for illustrating a method for decoding a video according to an embodiment.

FIG. 7 is a flow diagram for illustrating a method for decoding a video according to an embodiment.

Upon receiving bitstream for the video via a wired/wireless communication network or cable, video decoding apparatus 600 may store the same before reproducing the video through decoding and reconstructing following an algorithm of the user's choice of a program or another program in execution.

To this end, video decoding apparatus 600 may decode the bitstream to extract a square residual block representing information on the current block of the video at S710. Video decoding apparatus 600 may perform inverse quantization with respect to the extracted square residual block at S720, perform inverse transformation with respect to the inverse quantized square residual block into a time domain at S730, and perform inverse rearrangement with respect to the inverse transformed residual block of the time domain into a rectangular residual block in the predicted direction at S740.

Video decoding apparatus 600 may predict a rectangular current block by using one or more adjacent pixels in their prediction directions to generate a rectangular prediction block at S750, add the rectangular residual block to the rectangular prediction block to generate the rectangular current block at S760, and reconstruct the video by using the rectangular current block according to the prediction direction at S770.

Figure 8:
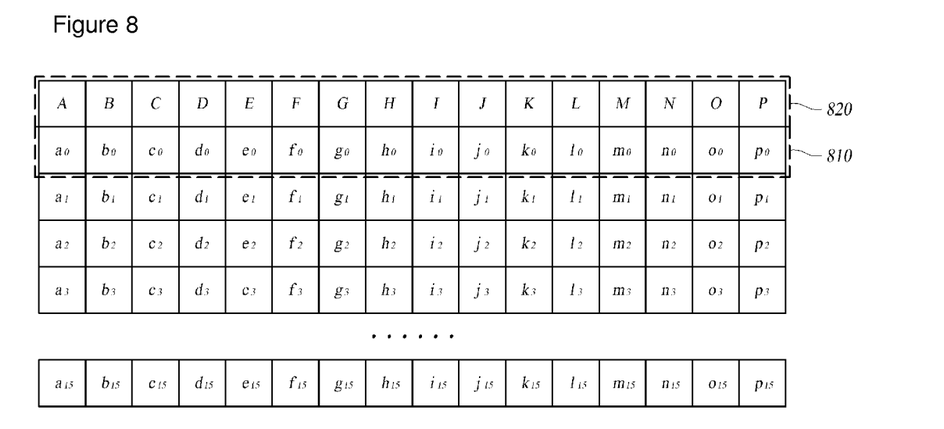
FIG. 8 is a diagram for illustrating a rectangular current block for the intra_16×16 prediction according to an embodiment.

FIG. 8 is a diagram showing a rectangular current block for the intra_16×16 prediction according to an embodiment.

Upon receiving the input video, block rectangle-shaper 410 of video encoding apparatus 400 may acquire the prediction direction that is predetermined or determined by intra predictor 420 to generate the rectangular current block along the prediction direction from the input video. In addition, rectangular block reconstructor 670 may reconstruct the output video in the prediction direction by using the rectangular current block. FIG. 8 shows the rectangular current block in 16×16 prediction with the prediction direction being vertical.

The respective pixels marked by upper case A~P are adjacent pixels that have been encoded or decoded previously, as the lower case $a_x$~$p_x$ (x=0, 1, 2, ... , 15) indicate the respective macroblock pixels sized 16×16. In the typical intra 16×16 prediction, if the prediction is in vertical direction, $a_1$ may be predicted from the adjacent pixel A with the closest proximity but $a_{15}$ have to be predicted from the fairly remote adjacent pixel A. Therefore, the predicted pixel value of $a_{15}$ should have low prediction accuracy.

However, in the present disclosure, intra predictor 420 of video encoding apparatus 400 as well as intra predictor 660 of video decoding apparatus 600 may predict a 16×1 rectangular current block 810 with pixels $a_x$~$p_x$ (x=0, 1, 2, ... , 15) rather than 16×16 sized block by using the adjacent block 820 that was previously encoded or decoded and has pixels A~P with the respectively closest proximity to the pixels of current block 810.

Figure 9:
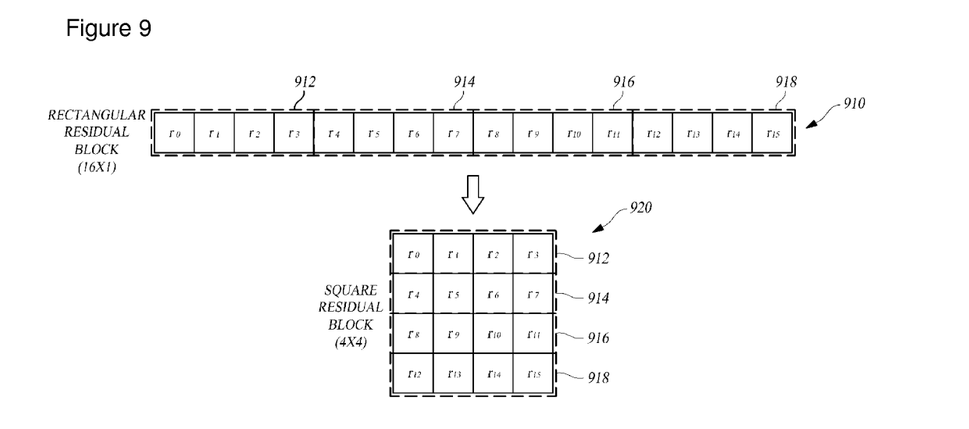
FIG. 9 is a diagram for illustrating a rearrangement of a 16×1 of rectangular residual block into a square residual block according to an embodiment.

FIG. 9 is a diagram for illustrating a rearrangement of a 16×1 of rectangular residual block into a square residual block.

Predicting the respective values of the pixels $a_0$~$p_0$ of the rectangular current block 810 shown in FIG. 8 with the respective values of the pixels A~P of the adjacent encoded block 820 may yield the rectangular residual block 910 as shown in FIG. 9 ($r_0$=original pixel value of $a_0$—predicted pixel value of $a_0$).

When the rectangular residual block 910 is generated as shown in FIG. 9, rearranger 440 may rearrange the 16×1 sized residual block 910 into a 4×4 sized square residual block 920. Here, the 16×1 sized residual block 910 may be classified into four 4×1 sized rectangular residual blocks (912 to 918), as rearranger 440 arranges the four blocks (912 to 918) respectively to different rows within the 4×4 sized square residual block 920 generated.

Specifically, in the rectangular residual block 910, the first residual block 912 forms the first row of the square residual block 920, and likewise, the second residual block 914 the second row, the third residual block 916 the third row, and the fourth residual block 918 the fourth row thereof.

The rearranged square residual block 920 by the rearranger 440 as described above may be transformed by the transformer 450 into the frequency domain and quantized by quantizer 460 before being encoded into a bitstream by encoder 470.

In the video decoding apparatus 600, decoder 610 may extract a square residual block from the bitstream received from the video encoding apparatus 400, perform inverse quantization with respect to the square residual block at the inverse quantizer 620, perform inverse transform with respect to the square residual block at inverse transformer 630 and then perform inverse rearrangement with respective to the square residual block into rectangular residual block.

In other words, inverse rearranger 640 rearranges the square residual block 920 illustrated in FIG. 9 back into the rectangular residual block 910 in a reverse process to reconstruct the first row of the square residual block 920 into the first residual block 912 of the rectangular residual block 910, the second row of the square residual block 920 into the second residual block 914 of the rectangular residual block 910, the third row of the square residual block 920 into the third residual block 916 of the rectangular residual block 910, and the fourth row of the square residual block 920 into the fourth residual block 918 of the rectangular residual block 910.

When the rectangular residual block 910 is reconstructed by the inverse rearranger 640, intra predictor 660 of video decoding apparatus 600 identifies the rectangular current block that corresponds to the reconstructed rectangular residual block 910, predicts the value of each pixel in the identified rectangular current block by using the adjacent pixels A~P which were previously decoded and are in proximity with the current block in the prediction direction that is vertical in this exemplary description, and then adder 650 adds the rectangular prediction block to the rectangular residual block to generate the rectangular current block 810.

In this way, from the encoded or decoded rectangular current block, i.e. the 16×16 block for the intra 16×16 prediction at its first row pixels $a_0$~$p_0$, the prediction is performed with respect to the second row pixels $a_1$~$p_1$ by using the reconstructed pixels $a_0$~$p_0$ as the predictors therefor in order to encode or decode the same. Likewise, the third row pixels may be predicted from the second row pixels. The same process may be applied to all the rows enabling the entire pixels in the macroblock under the intra 16×16 prediction to be predicted starting from the adjacent pixel with the closest proximity in the prediction direction before being compressed/reconstructed.

Similar to the vertical prediction direction, pixel predictions in the horizontal direction may be performed for the entire pixels starting from the most proximal adjacent pixel for their compression/reconstruction.

On the other hand, although the above description is directed to the intra_16×16 prediction with FIGS. 8 and 9, the present disclosure may also apply to the intra 8×8 prediction.

Figure 10:
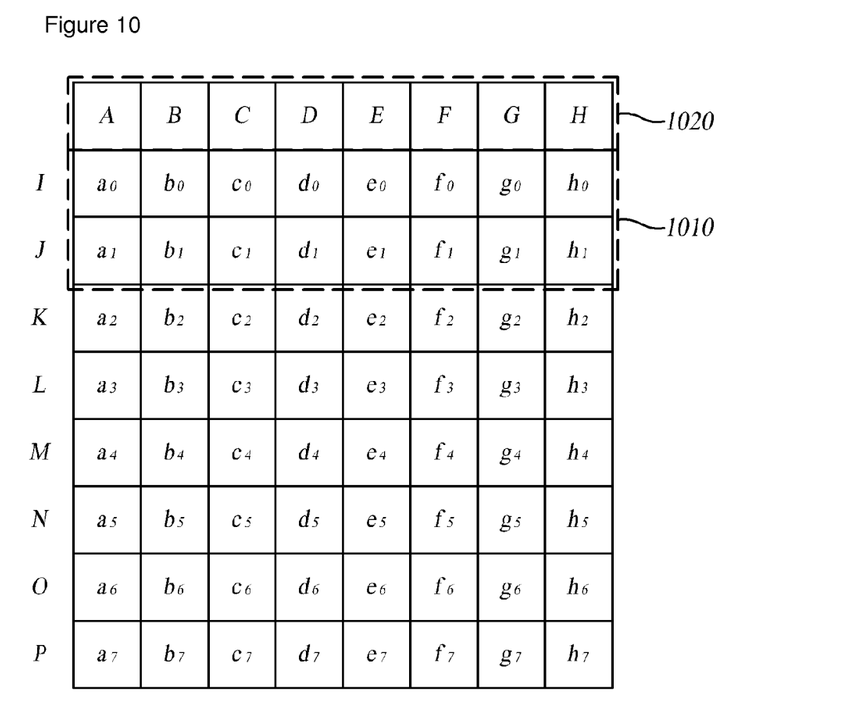
FIG. 10 is a diagram showing a rectangular current block for the intra_8×8 prediction according to an embodiment.

FIG. 10 is a diagram showing a rectangular current block for the intra_8×8 prediction according to an embodiment.

In FIG. 8, illustrated was the intra_8×8 prediction for the rectangular current block with the prediction direction set to be horizontal.

The respective pixels marked by upper cases A~H are adjacent pixels that have been encoded or decoded previously, as the lower cases $a_0$~$h_7$ indicate the respective macroblock pixels sized 8×8 in the intra prediction. In the typical intra_8×8 prediction, assuming the prediction is in vertical direction, $a_0$ may be predicted from adjacent pixel A with the closest proximity but $a_7$ has to be predicted from adjacent pixel A from a fairly extended distance. Therefore, the predicted pixel value of $a_{15}$ has a low accuracy.

In an embodiment of the present disclosure, intra predictor 420 of video encoding apparatus 400 as well as intra predictor 660 of video decoding apparatus 600 may predict an 8×2 sized rectangular current block 1010 with pixels $a_0$~$h_1$ instead of the 8×8 sized block by using the adjacent block 1020 that was previously encoded or decoded and has pixels A~H with the respectively closest proximity to the pixels of current block 1010.

When predicting the rectangular current block 1010, its first row and second row pixels $a_0$~$h_0$ and $a_1$~$h_1$ may be respectively predicted from the pixels A~H, thereby determining the predicted pixel values. Subtracting the predicted pixel value of each pixel in the rectangular current block 1010 from the original pixel value of each pixel in the same current block 1010 may yield a rectangular residual block as shown in FIG. 11.

Figure 11:
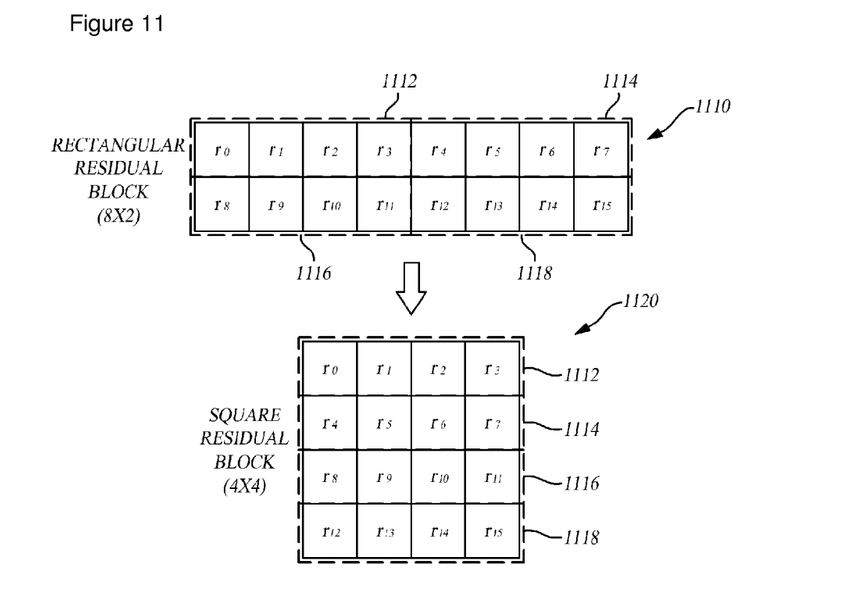
FIG. 11 is a diagram for illustrating a rearrangement of an 8×2 of rectangular residual block into a square residual block according to an embodiment.

FIG. 11 is a diagram for illustrating a rearrangement of an 8×2 of rectangular residual block into a square residual block according to an embodiment.

Upon generating the rectangular residual block 1110, rearranger 440 may rearrange the 8×2 sized rectangular residual block 1110 into a 4×4 sized square residual block 1120. Here, the 8×2 sized residual block 1110 can be divided into four 4×1 sized rectangular residual blocks (1112 to 1118), as rearranger 440 arranges the four blocks (1112 to 1118) respectively to different rows within the 4×4 sized square residual block 1120.

Specifically, in the rectangular residual block 1110, the first residual blocks 1112 forms the first row of the square residual block 1120, the second residual block 1114 the second row, the third residual block 1116 the third row, and the fourth residual block 1118 the fourth row thereof.

The rearranged square residual block 1120 as described above may be transformed by the transformer 450 into the frequency domain and quantized by quantizer 460 prior to being encoded into a bitstream by encoder 470.

In the video decoding apparatus 600, decoder 610 may extract a square residual block from the bitstream received from the video encoding apparatus 400, perform inverse quantization with respect to the square residual block at the inverse quantizer 620, perform inverse transform with respect to the square residual block at inverse transformer 630 and then perform inverse rearrangement with respective to the square residual block into rectangular residual block.

In other words, inverse rearranger 640 rearranges the square residual block 1120 illustrated in FIG. 11 back into the rectangular residual block 1110 in a reverse process to reconstruct the first row of the square residual block 1120 into the first residual block 1112 of the rectangular residual block 1110, the second row of the square residual block 1120 into the second residual block 1114 of the rectangular residual block 1110, the third row of the square residual block 1120 into the third residual block 1116 of the rectangular residual block 1110, and the fourth row of the square residual block 1120 into the fourth residual block 1118 of the rectangular residual block 1110.

When the rectangular residual block 1110 is reconstructed by the inverse rearranger 640, intra predictor 660 of video decoding apparatus 600 sets the rectangular current block as an 8×2 sized rectangle in accordance with the prediction direction, predicts the value of each pixel in the rectangular current block by using adjacent pixels A~H which were previously decoded and are in proximity with the current block in the currently vertical prediction direction, and then adder 650 adds the rectangular prediction block to the rectangular residual block to generate the rectangular current block 1010.

Likewise, from the reconstructed rectangular current block, i.e. the 8×8 block for the intra_8×8 prediction at its second row pixels $a_1$~$h_1$, the reconstructive prediction is performed with respect to the third and fourth row pixels $a_2$~$h_3$ by using the reconstructed pixels $a_1$~$h_1$ as the predictors therefor. Likewise, the fifth and sixth row pixels may be predicted from the fourth row pixels. The same process may be applied to all of the rows enabling the entire pixels in the macroblock to be predicted starting from the adjacent pixel with the closest proximity in the prediction direction before being compressed/reconstructed.

Similar to the vertical prediction direction, pixel predictions in the horizontal direction may be performed for the entire pixels starting from the most proximal adjacent pixel for their compression/reconstruction.

Figure 12:
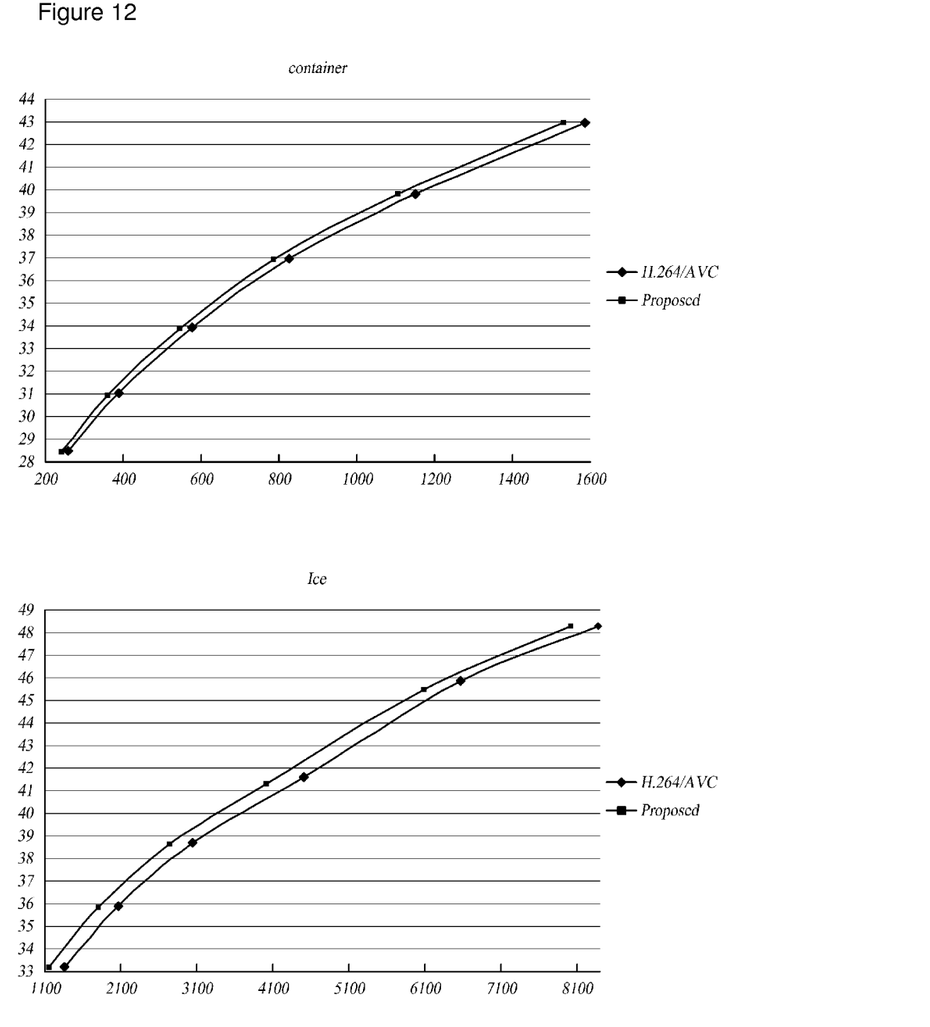
FIG. 12 at a and b illustrates the Rate-Distortion curves according to the conventional and presently disclosed methods, respectively.

FIG. 12 at a and b illustrates the Rate-Distortion curves according to the conventional and presently disclosed methods, respectively.

Illustrated in FIG. 12 are test results of the compression performance of an embodiment wherein the block is constructed into a rectangle and a prediction is performed with respect to each of the current block pixel values from the most proximal adjacent pixel. Detailed test conditions are indicated in Table 1 with the result reflecting the respective paired video images compressed by using the intra frames alone.

TABLE 1

| Sequence | Resolution | Experiments condition |
| --- | --- | --- |
| Foreman, News Container Paris, Tempete | QCIF (176 × 144) CIF (352 × 288) | High profile Intra(I frame) only Intra16 × 16 only QP(20, 24, 28, 32, 36, 40) CABAC Deblockking Filter off |
| City, ICE | 4CIF (704 × 576) | |

A comparison in the rate-distortion curve or R-D curve was made between typical H.264 where the prediction is done with square blocks and the present embodiment where the prediction of the rectangular block is followed by encoding the rearranged squared block. In the experiment, since the deblocking filer used in typical H.264 would not function properly in the present embodiment due to its fixed configuration for the rectangular blocks, such a filter was not used in either of the test methods. Table 2 shows the results.

TABLE 2

| | | Bit Rate Reduction (%) | | | | | | PNSR difference |
| --- | --- | --- | --- | --- | --- | --- | --- | --- |
| Size | Sequence | QP20 | QP24 | QP28 | QP32 | QP36 | QP40 | (average) |
| QCIF | Foreman | 1.92 | 1.96 | 2.47 | 3.01 | 4.23 | 4.09 | 0.08 |
| | News | 2.41 | 2.91 | 3.86 | 4.14 | 4.07 | 5.36 | 0.11 |
| | Container | 3.42 | 4.00 | 4.80 | 5.47 | 7.44 | 6.57 | 0.06 |
| CIF | Paris | 1.91 | 2.19 | 2.28 | 3.11 | 3.79 | 5.45 | 0.12 |
| | Tempete | 1.36 | 1.37 | 1.44 | 1.57 | 2.45 | 3.50 | 0.03 |
| 4CIF | City | 3.56 | 3.28 | 3.91 | 5.01 | 6.96 | 10.10 | 0.12 |
| | Ice | 4.36 | 7.32 | 11.22 | 9.84 | 12.44 | 15.28 | 0.13 |

As specified in Table 2, when the rectangular block based method of prediction, encoding and decoding is carried out in parallel with the conventional square counterpart, bit rate reductions can be observed in various experimental video images. In addition, the compared R-D curves of images of a container in FIG. 12 at a and ice at b show the visible performance improvement over the conventional H.264 method.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes. Accordingly, the scope of the disclosure is not to be limited by the above embodiments but by the claims and the equivalents thereof.

INDUSTRIAL APPLICABILITY

As described above, the present disclosure is applicable to video encoding/decoding where the current block of the video is predicted from the adjacent blocks, and is able to predict the entire pixels of the current block starting from closest one of the pixels in the prediction direction in preparation of encoding/decoding the video, and thus provides a highly useful method to raise the compression efficiency that in turn ensures more efficient video encoding/decoding performance.

The invention claimed is:

1. A method of encoding an intra block in the unit of sub-blocks, the method comprising:
    selecting an intra prediction mode of the intra block from among a plurality of intra prediction modes;
    dividing the intra block into a plurality of sub-blocks;
    encoding information on the selected intra prediction mode of the intra block into a bitstream; and
    encoding the plurality of sub-blocks into the bitstream based on sequentially predicting the plurality of sub-blocks in a predefined order by using neighboring pixels adjacent to each of the plurality of sub-blocks,
    wherein each of the plurality of sub-blocks is predicted by using the same intra prediction mode as the selected intra prediction mode of the intra block,
    wherein the number of pixels of each sub-block is the square of a natural number,
    wherein the encoding of the plurality of sub-blocks comprises:
        predicting a first sub-block of the sub-blocks based on the same intra prediction mode as the selected intra prediction mode of the intra block to generate a predicted sub-block;
        generating a residual sub-block by subtracting the predicted sub-block from the first sub-block;
        generating a reconstructed sub-block by using the residual sub-block and the predicted sub-block;
        identifying one or more pixels in the reconstructed sub-block for predicting a second sub-block which is subsequent to the first sub-block in the predefined order, the one or more pixels in the reconstructed sub-block being located adjacent to the second sub-block; and
        predicting the second sub-block based on the same intra prediction mode as the selected intra prediction mode of the intra block, and based on the one or more pixels in the reconstructed sub-block, instead of original pixels in the first sub-block,
    wherein the plurality of sub-blocks have a size L×M, respectively,
        where L is a horizontal length, M is a vertical length, L is unequal to M, and L and M are natural numbers,
    wherein the values of L and M are determined in accordance with a prediction direction of the selected intra prediction mode,
    wherein the value of L is greater than the value of M when the prediction direction is vertical or the value of L is smaller than the value of M when the prediction direction is horizontal.

2. An apparatus for encoding an intra block in the unit of sub-blocks, the apparatus comprising:
    a block rectangle-shaper configured to divide the intra block into a plurality of sub-blocks;
    an intra-predictor configured to
        select an intra prediction mode of the intra block from among a plurality of intra prediction modes, and
        predict the plurality of sub-blocks based on sequentially predicting the plurality of sub-blocks in a predefined order by using neighboring pixels adjacent to each of the plurality of sub-blocks;
    a subtractor configured to generate a residual sub-block by subtracting a predicted sub-block from a first sub-block of the sub-blocks;
    a transformer configured to transform the residual sub-block into a frequency domain;
    a quantizer configured to perform quantization with respect to the transformed residual sub-block; and
    an encoder configured to encode information on the selected intra prediction mode of the intra block and the quantized residual sub-block into a bitstream,
    wherein the number of pixels of each sub-block is the square of a natural number,
    wherein each of the plurality of sub-blocks is predicted by using the same intra prediction mode as the selected intra prediction mode of the intra block,
    wherein the intra-predictor is further configured to
        identify one or more pixels in a reconstructed sub-block for predicting a second sub-block which is subsequent to the first sub-block in the predefined order, the one or more pixels in the reconstructed sub-block being located adjacent to the second sub-block, and
        predict the second sub-block based on the same intra prediction mode as the selected intra prediction mode of the intra block, and based on the one or more pixels in the reconstructed sub-block, instead of original pixels in the first sub-block, and
    wherein the reconstructed sub-block is reconstructed by using the residual sub-block and the predicted sub-block,
    wherein the plurality of sub-blocks have a size L×M, respectively,
        where L is a horizontal length, M is a vertical length, L is unequal to M, and L and M are natural numbers,
    wherein the values of L and M are determined in accordance with a prediction direction of the selected intra prediction mode,
    wherein the value of L is greater than the value of M when the prediction direction is vertical or the value of L is smaller than the value of M when the prediction direction is horizontal.

3. A method of decoding an intra block in the unit of sub-blocks, the method comprising:
    obtaining mode information of the intra block from a bitstream;
    determining an intra prediction mode of the intra block from among a plurality of intra prediction modes, based on the obtained mode information;
    identifying a plurality of sub-blocks of the intra block when the intra block is divided into the plurality of sub-blocks; and
    reconstructing the plurality of sub-blocks based on sequentially predicting the plurality of sub-blocks in a predefined order by using neighboring pixels adjacent to each of the plurality of sub-blocks,
    wherein each of the plurality of sub-blocks is predicted by using the same intra prediction mode as the determined intra prediction mode of the intra block,
    wherein the number of pixels of each sub-block is the square of a natural number,
    wherein the reconstructing of the plurality of sub-blocks comprises:
        predicting a first sub-block of the sub-blocks based on the same intra prediction mode as the determined intra prediction mode of the intra block to generate a predicted sub-block;
        reconstructing a residual sub-block of the first sub-block by decoding the bitstream;
        adding the predicted sub-block to the reconstructed residual sub-block to thereby generate a reconstructed sub-block;
        identifying one or more pixels in the reconstructed sub-block for predicting a second sub-block which is subsequent to the first sub-block in the predefined order, the one or more pixels in the reconstructed sub-block being located adjacent to the second sub-block; and predicting the second sub-block based on the same intra prediction mode as the selected intra prediction mode of the intra block, and based on the one or more pixels in the reconstructed sub-block, wherein the plurality of sub-blocks have a size L×M, respectively, where L is a horizontal length, M is a vertical length, L is unequal to M, and L and M are natural numbers, wherein the values of L and M are determined in accordance with a prediction direction of the selected intra prediction mode, wherein the value of L is greater than the value of M when the prediction direction is vertical or the value of L is smaller than the value of M when the prediction direction is horizontal.

4. An apparatus for decoding an intra block in the unit of sub-blocks, the apparatus comprising:

a decoder configured to obtain mode information of the intra block from a bitstream, identify a plurality of sub-blocks of the intra block when the intra block is divided into the plurality of sub-blocks, and extract a plurality of residual sub-blocks corresponding to the sub-blocks from the bitstream;

an inverse quantizer configured to perform an inverse quantization with respect to an extracted residual sub-block to generate an inverse-quantized residual sub-block;

an inverse transformer configured to perform an inverse transformation with respect to the inverse-quantized residual sub-block to thereby generate a reconstructed residual sub-block;

an intra predictor configured to sequentially predict the plurality of sub-blocks in a predefined order by using neighboring pixels adjacent to each of the plurality of sub-blocks, according to an intra prediction mode determined for the intra block from the mode information; and an adder configured to add a predicted sub-block to the reconstructed residual sub-block to thereby generate a reconstructed sub-block, wherein each of the plurality of sub-blocks is predicted by using the same intra prediction mode as the determined intra prediction mode of the intra block, wherein the number of pixels of each sub-block is the square of a natural number, and wherein the intra-predictor is further configured to identify one or more pixels in the reconstructed sub-block for predicting a second sub-block which is subsequent to the first sub-block in the predefined order, the one or more pixels in the reconstructed sub-block being located adjacent to the second sub-block, and predict the second sub-block based on the same intra prediction mode as the selected intra prediction mode of the intra block, and based on the one or more pixels in the reconstructed sub-block, wherein the plurality of sub-blocks have a size L×M, respectively, where L is a horizontal length, M is a vertical length, L is unequal to M, and L and M are natural numbers, wherein the values of L and M are determined in accordance with a prediction direction of the selected intra prediction mode, wherein the value of L is greater than the value of M when the prediction direction is vertical or the value of L is smaller than the value of M when the prediction direction is horizontal.

5. The method of claim 1, wherein the intra block is divided into the plurality of sub-blocks depending on a division direction determined according to a prediction direction of the selected intra prediction mode.

6. The method of claim 3, wherein the intra block is divided into the plurality of sub-blocks depending on a division direction determined according to a prediction direction of the determined intra prediction mode.

* * * * *